United States Patent [19]

Tsunoda et al.

[11] Patent Number: 4,763,359
[45] Date of Patent: Aug. 9, 1988

[54] METHOD AND SYSTEM OF PROCESSING IMAGE SIGNALS

[75] Inventors: Teruo Tsunoda, Chiba; Ryoichi Kokawa, Nara, both of Japan

[73] Assignee: Komori Printing Machinery Co., Ltd., Japan

[21] Appl. No.: 918,485

[22] Filed: Oct. 14, 1986

Related U.S. Application Data

[62] Division of Ser. No. 447,749, Dec. 8, 1982, Pat. No. 4,649,566.

[30] Foreign Application Priority Data

May 19, 1982 [JP] Japan .................................. 57-84545

[51] Int. Cl.$^4$ .............................................. G06K 9/00
[52] U.S. Cl. ........................................ 382/1; 101/365; 358/50; 382/53
[58] Field of Search ...................... 382/1, 53; 101/365, 101/DIG. 26, 426; 358/80, 101, 107, 106

[56] References Cited

U.S. PATENT DOCUMENTS 3,958,509  5/1976  Murray et al. ...................... 358/107
4,402,015  8/1983  Yamada ................................ 358/80

Primary Examiner—Leo H. Boudreau
Attorney, Agent, or Firm—Remy J. VanOphem

[57] ABSTRACT

In an image area measuring apparatus of the type wherein an image bearing surface of a lithographic printing plate is photographed with a television camera to produce an image signal, the image signal is converted into a digital signal to obtain a measured value and an image area of each one of a plurality of zones of the image bearing surface is determined by an arithmetic operation utilizing the measured value, the image signal is judged by the step of judging the image signal by taking the percentage of dot ratio of a predetermined constant value as a 100% dot ratio when the image bearing surface does not contain a portion corresponding to 100% dot ratio. Further the image signal is proofed by a method including the steps of obtaining a proof value corresponding to the measured value from a compensation table utilizing logarithmic functions by using a proof plate having a uniform light reflective index, determining a proof value for the measured value of the lithographic printing plate from the proof table, determining a difference between the proof value and the compensation value, and determining the image area from the difference.

1 Claim, 10 Drawing Sheets

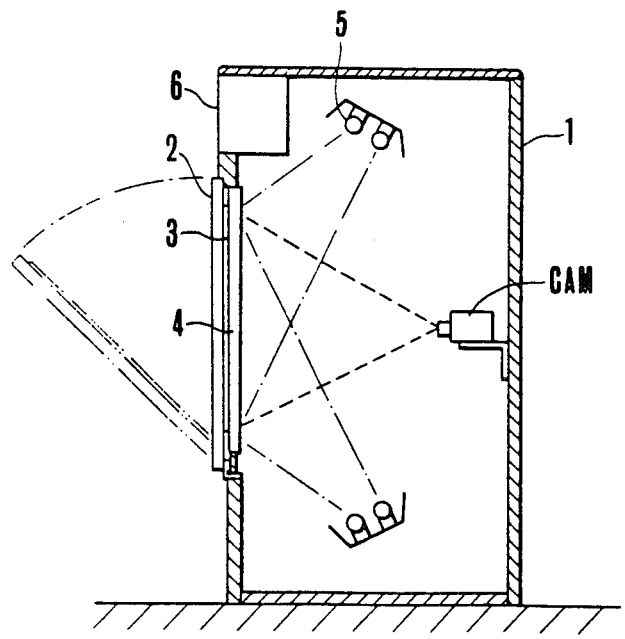
F I G. 1

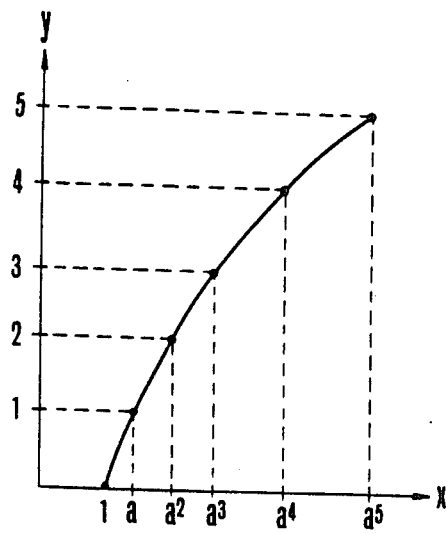
F I G. 13
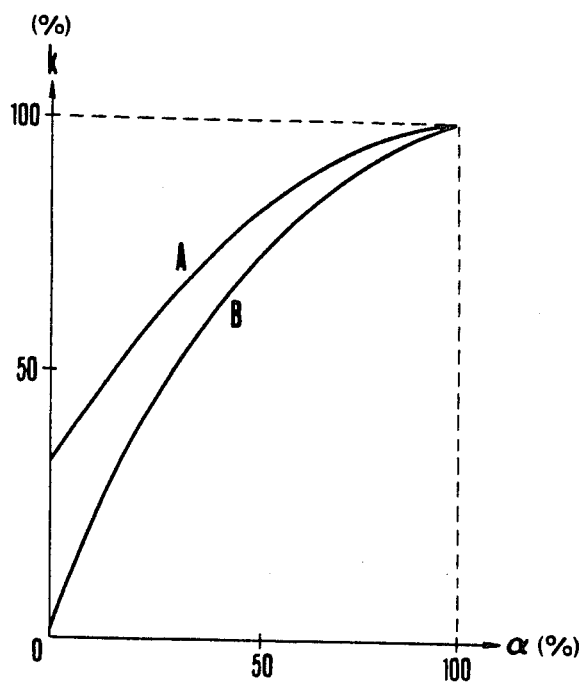
F I G. 14

METHOD AND SYSTEM OF PROCESSING IMAGE SIGNALS

This is a division of application Ser. No. 447,749, filed Dec. 8, 1982, now U.S. Pat. No. 4,649,566.

BACKGROUND OF THE INVENTION

This invention relates to a method and system of processing image signals in which an image area of a lithographic printing plate of an offset printing press or the like is measured, the image area is divided into a plurality of zones, and an image signal is supplied to an image area measuring device that determines the quantity of ink supplied to each zone at the time of printing.

A typical example of such a device is disclosed in U.S. Pat. No. 3,958,509 in which the image area is determined by photographing an image bearing surface with an image pick up tube of a television camera to produce an image signal and then arithmetically processing the image signal.

With this device, however, it is essential to provide a solid portion corresponding to 100% dot ratio in a margin of a lithographic printing plate for the purpose of determining the dot ratio percentage of various portions of the image. Accordingly, it is necessary to provide a solid portion for effecting a proof for a lithographic printing plate. Accordingly, for a lithographic printing plate not provided with a solid portion for the proof, the measurement of the image area cannot be made.

Moreover, when photographing the image bearing surface, there are such problems as nonuniformity in the light quantity irradiated, and decreases in the light quantity near a photographing lens so that it is necessary to remove nonuniformity in the photographing conditions caused by these problems. According to the prior art method, the proof has been made by arithmetic operations including multiplying and subtraction operations so that the time required for the arithmetic operations is large, thus, making it impossible to rapidly determine the image area.

SUMMARY OF THE INVENTION

Accordingly, it is an object of this invention to provide an effective method of judging an image signal that can eliminate the difficulty described above, that is, the necessity of providing a solid portion for effecting the proof.

Another object of this invention is to provide a method of proofing an image signal with only a simple subtraction operation.

According to this invention, there is provided a method of judging an image signal for use in an image area measuring apparatus of the type wherein an image bearing surface of a lithographic printing plate is photographed with a television camera to produce an image signal, the image signal is converted into a digital signal to obtain a measured value, and an image area for each one of a plurality of zones formed by dividing the image bearing surface is determined by an arithmetic operation utilizing the measured value. The method includes the step of judging the image signal by taking the percentage of dot ratio of a predetermined constant value as a 100% dot ratio when the image bearing surface does not contain a portion corresponding to 100% dot ratio.

According to another aspect of this invention, there is provided a method of proofing an image signal for use in an image measuring apparatus of the type wherein an image bearing area of a lithographic printing plate is photographed with a television camera to produce an image signal, the image signal is converted into a digital signal to obtain a measured value, and an image area of each of a plurality of zones formed by dividing the image bearing surface is determined by an arithmetic operation utilizing the measured value. The method includes the steps of obtaining a proof value corresponding to the measured value, which is based on a proof by using a proof plate having a uniform light reflective index reflectivity, from a compensation table utilizing logarithmic functions determining a compensation value for the measured value of the lithographic printing plate from the compensation table, determining a difference between the proof value and the compensation value, and determining the image area from the difference.

BRIEF DESCRIPTION OF THE DRAWINGS

In the accompanying drawings:

FIG. 1 is a vertical sectional view showing the image pick up unit;

FIG. 13 is a graph showing the characteristics of the compensation table; and

FIG. 14 is a graph showing the characteristics of the conversion table.

DESCRIPTION OF THE PREFERRED EMBODIMENT

Figure 2A:
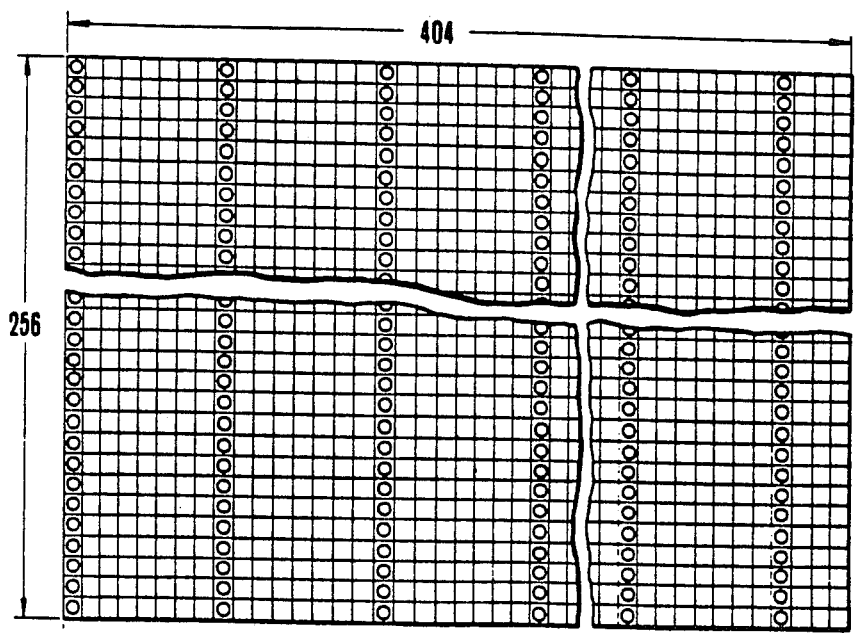
FIG. 2A is a front view showing solid state photoelectric converting element groups of a television camera.

The image pick up unit shown in FIG. 1 includes a camera box 1 having an openable lid 2 on one side. A lithographic printing plate 3 is positioned on the inner surface of the camera with a guide pin, not shown, with its image bearing surface faced inside. When the lid 2 is closed the lithographic printing plate 3 is clamped between a transparent plate 4, made of glass or the like, and the lid in a flat state.

A light source 5, in the form of a fluorescent lamp or the like, is disposed to oppose the transparent plate 4 to be movable in the vertical direction or in the vertical and horizontal directions. Accordingly, the image bearing surface of the lithographic printing plate 3 is photographed by a television camera CAM (hereinafter merely called a camera) having solid state photoelectric converting elements which are arranged in a matrix.

An operating plate 6 is positioned above the lid 2 for supporting a display cathode ray tube, switch groups including display lamps, a keyboard for inputting a code, and such output devices as a printer, a magnetic card mechanism or the like.

Figure 2B:
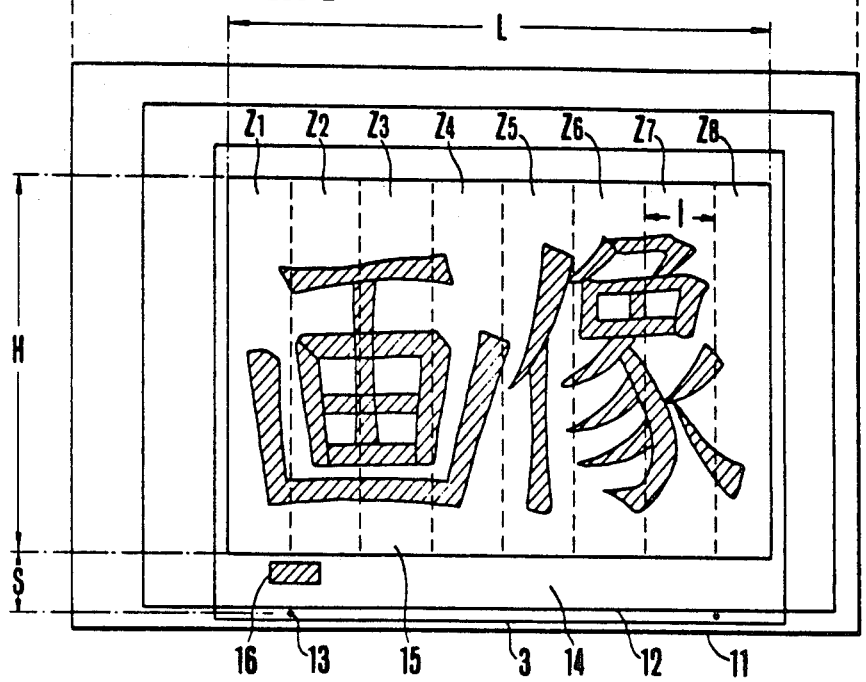
FIG. 2B is a plan view showing the inner side of a lid or door of the image pick up unit.

FIG. 2A shows the solid state photoelectric converting elment groups and FIG. 2B shows the inner side of the lid 2.

The solid state photoelectric converting element groups are arranged in a matrix consisting of 404 rows and 256 columns to cover an area 11 to be photographed. The area 12 to be actually photographed, however, is determined to be smaller than the area 11. The lithographic printing plate 3 is positioned in the actual photographing area 12 by guide pins 13.

The lithographic printing plate 3 has a peripheral margin 14 so that a portion to be actually printed is only the image bearing surface 15 having a width L and a height H. The spacing between the guide pins 13 and the lower edge of the image bearing surface 15 is denoted by S. However, it should be understood that these dimensions differ depending upon the size of the lithographic printing plate 3.

In this example, the image bearing surface 15 is divided into a plurality of zones $Z_1$ to $Z_8$ each having a width of l. Corresponding thereto, the solid state photoelectric converting elements are imaginarily arbitrarily divided into groups in the horizontal direction, each including eight elements, so that the sampling operation for reading image signals from the solid state photoelectric converting elements can be made sequentially and repeatedly for each group according to the order of arrangement of the elements in the horizontal direction.

A solid portion for effecting proof and corresponding to 100% dot ratio at the time of the offset printing is provided for the margin 14 of the lithographic printing plate 3. However, when the image contains a portion corresponding to the solid portion, the solid portion 16 for effecting proof may be omitted.

Figure 3:
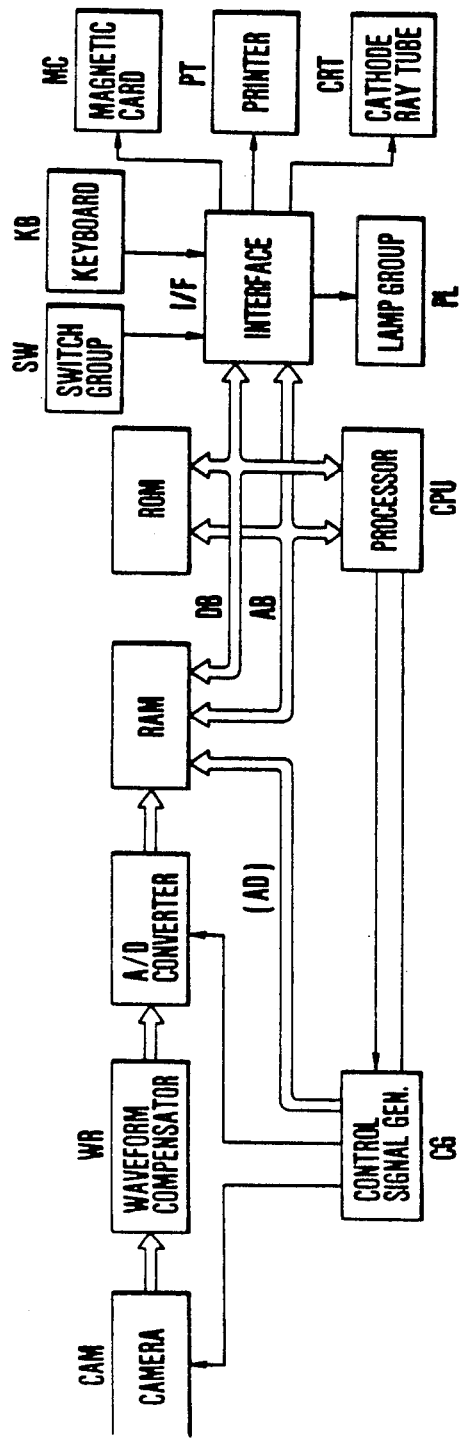
FIG. 3 is a block diagram of a circuit utilized in this invention.

FIG. 3 is a block diagram of an electric circuit including the camera CAM. The crest value of the image signal from the camera is compensated for by a waveform compensator WR to be described later. The corrected signal is converted into a digital signal by an analog/digitial converter A/D containing a sample/-hold circuit. The digital signal that is the measured value is stored in a RAM.

The contents of the RAM is read by a processor CPU, such as a microprocesor. The processor CPU executes a predetermined arithmetic operation based on the read out content to determine the image area of each of the zones $Z_1$ to $Z_8$, thus determining ink supply quantity for each zone. The ink quantity signal determined is sent to a magnetic card mechanism MC, a printer PT, and a cathode ray tube CRT via an interface I/F.

The operation of the camera CAM is controlled by a synchronizing signal from a control signal generator CG. In response to a sampling pulse generated by the control signal generator CG, the A/D converter performs sample/hold and conversion. The RAM is also supplied with an address designation signal from the control signal generator CG so as to sequentially store the output of the A/D converter.

The processor CPU executes predetermined arithmetic and control operations according to an instruction stored in the ROM. The CPU is also operated in accordance with instructions from a switch group SW and a keyboard KB via the interface I/F and turns ON and OFF a lamp group PL to display the operation state.

The processor CPU also gives a start signal to the control signal generator CG. When the camera CAM photographs a lithographic printing plate a termination signal is given to the processor CPU from the control signal generator CG, whereby the processor CPU starts its arithmetic operation.

Figure 4:
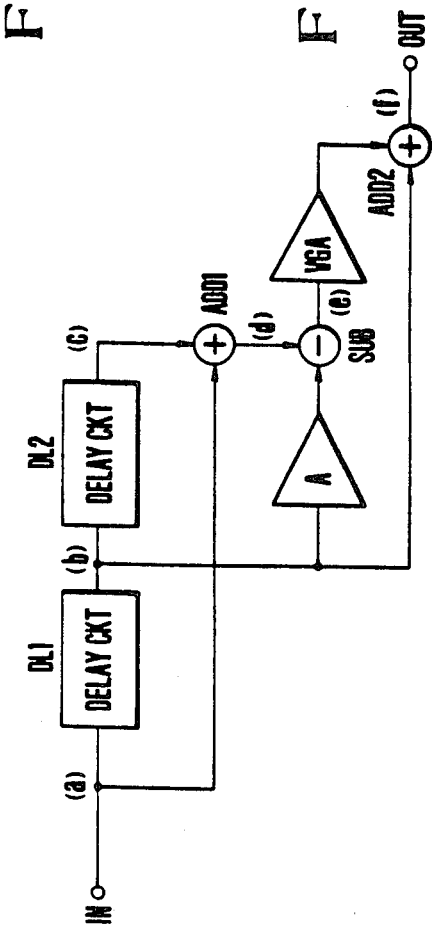
FIG. 4 is a block diagram showing a waveform compensator shown in FIG. 3.
Figure 5:
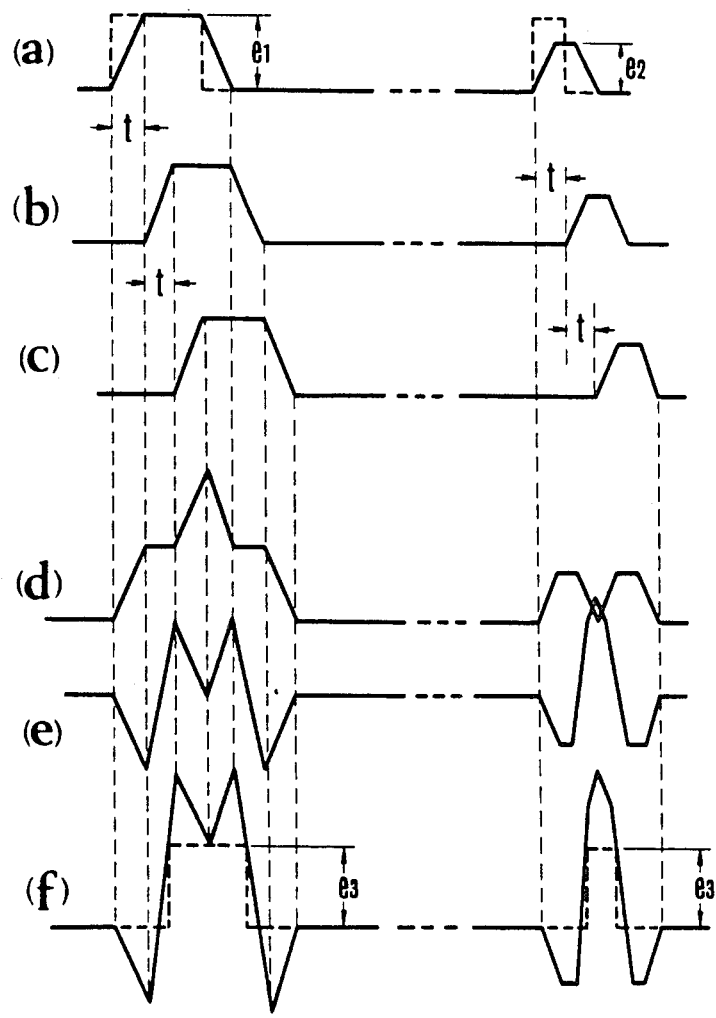
FIG. 5 shows waveforms at various portions of the waveform compensator shown in FIG. 4.

In FIG. 5, which illustrates the waveforms at various portions of the waveform compensator WR shown in FIG. 4, a portion corresponding to 100% dot ratio of the image (hereinafter called a solid portion) and having a sufficiently large area and corresponding signal waveforms are shown on the left, and signal waveforms corresponding to a solid portion having a small area are shown on the right.

Where a solid portion having a size shown by broken lines in FIG. 5a is photographed, an image signal shown by solid lines in FIG. 5a is produced. An image signal corresponding to a solid portion having a sufficiently large area rises with a build up time t and builds down with a similar build down time. Such waveform has a crest value $e_1$ corresponding to the reflectivity of the solid portion.

On the other hand, an image signal corresponding to a solid portion having a small area builds down before it rises sufficiently due to the transient characteristic of the camera CAM, so that such image signal will have a crest value $e_2$ smaller than $e_1$.

Where an image signal (a) is inputted to an input terminal IN, shown in FIG. 4, an output signal, shown in FIG. 5(f), can be obtained from an output terminal OUT. This means that even an image signal corresponding to a solid portion having a small area is converted into a signal having a sufficiently large crest value.

More particularly, in FIG. 4, first and second delay circuits $DL_1$ and $DL_2$ each having a delay time equal to the build up time t are connected in series. The image signal (a) inputted to the input terminal IN is delayed by the delay circuit $DL_1$, and its delayed output (b) is further delayed by the delay circuit $DL_2$ to produce an output (c).

The input to the delay circuit $DL_1$, i.e., the image signal (a) and the output (c) of the delay circuit $DL_2$ are added together with a first adder $ADD_1$ to obtain an output (d) which is applied to a subtractor SUB. The output of an amplifier A is equal to twice the output (b). In the subtractor SUB the output (d) is subtracted from the output of the amplifier A at a ratio of 2:1 to obtain an output (e).

The output (e) is applied to a second adder $ADD_2$ via a variable gain amplifier VGA to be added to the output (b). If the gain of the variable gain amplifier VGA is 1, the second adder $ADD_2$ produces an output (f).

Although the output (f) contains a waveform distortion caused by the arithmetic operation, a waveform as shown by broken lines in FIG. 5(f) can be obtained, where high pass frequency components are removed in a succeeding transmission system. Consequently, a waveform corresponding to a solid portion having a sufficiently large area and a waveform corresponding to a solid portion having a small area would have substantially the same crest value $e_3$.

Consequently, irrespective of the area, an image signal having a crest value corresponding to the solid portion can be obtained, thus eliminating any measurement error.

Depending upon the degree of compensation, the delay times of the delay circuits $DL_1$ and $DL_2$ may be determined to lie in a range of 0.5 to 1.5 times of the build up time t. In the same manner, the gain of the variable gain amplifier VGA can be determined in accordance with the degree of the waveform compensation.

The same object can be obtained by omitting the amplifier A and by providing a coefficient applicator which applies a coefficient 0.5 on the output side of the adder $ADD_1$. In certain case, the variable gain amplifier VGA may be omitted.

Figure 6:
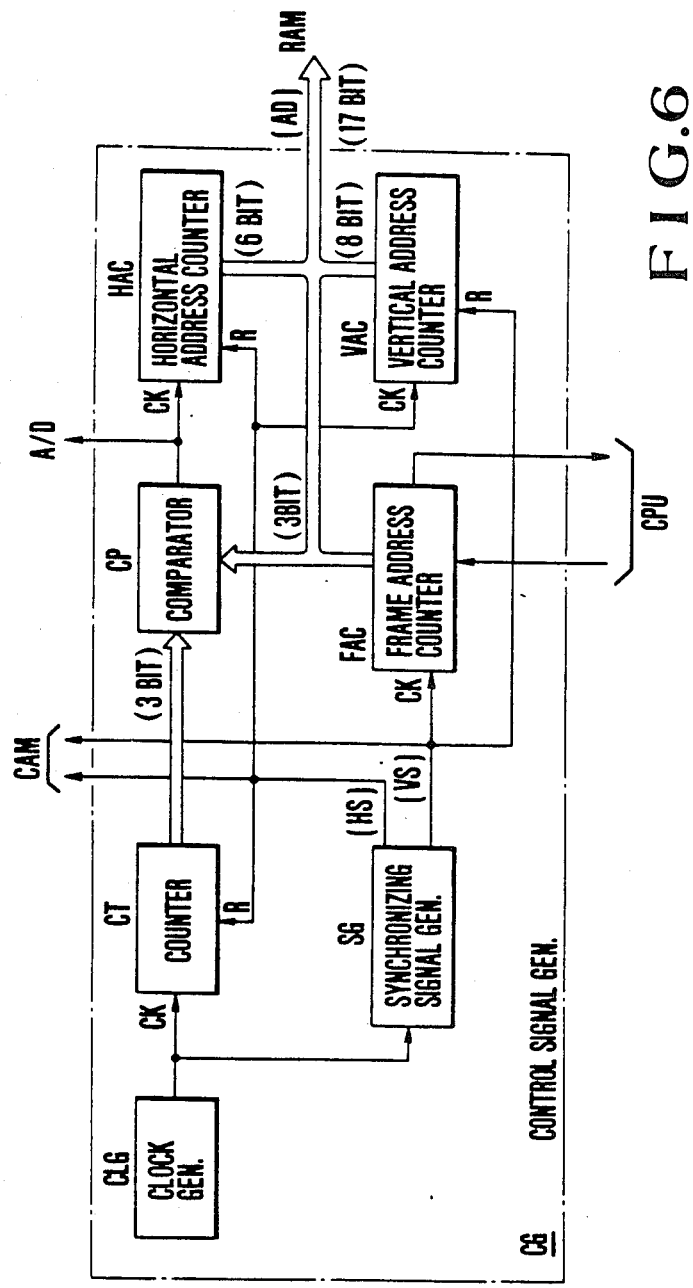
FIG. 6 is a block diagram showing the detail of the control signal generator shown in FIG. 3.

The control signal generator CG, as shown in FIG. 6, includes a clock generator CLG, a synchronizing signal generator SG generating a horizontal synchronizing signal HS and a vertical synchronizing signal VS, and a 3 bit counter CT corresponding to the number of the horizontal elements of each group of the solid state photoelectric converting elements shown in FIG. 2A (and dividing the frequency of the clock pulse generated by the clock generator CLG). The counter CT counts the number of the clock pulses from the clock generator CLG to produce logical count outputs "0, 0, 0" through "1, 1, 1" which are applied to a comparator CP.

After being reset by the horizontal synchronizing signal HS, the counter CT begins a new counting operation.

A 3 bit frame address counter FAC is provided to count the number of the vertical synchronizing signals VS to produce count outputs "0, 0, 0" through "1, 1, 1" which are applied to the comparator CP. When both input signals to the comparator CP coincide with each other a coincidence signal is sent to a horizontal address counter HAC and to the A/D converter shown in FIG. 3. The frame address counter FAC is reset by a start signal from the processor CPU to commence a new counting operation and when the outputs becomes a full count "1, 1, 1" it sends a termination signal to the processor CPU.

For this reason, the solid state photoelectric converting elements of the camera CAM shown in FIG. 2A are scanned in the row direction in accordance with the horizontal synchronizing signal HS so that by taking a period in which all elements are scanned as one frame, the frame is repeated in accordance with the vertical synchronizing signal so that image signals from respective solid state photoelectric converting elements are read out in the same manner as in a standard television system and applied to the A/D converter via the waveform compensator.

The sampling operation of the A/D converter is controlled by the output from the comparator CP. Thus, when the 3 bit frame address counter FAC counts the first frame, the counter output becomes "0, 0, 0" so that each time the output of the counter CT becomes "0, 0, 0", the comparator produces an output. Accordingly, in the first frame only the image signals of the solid state photoelectric converting elements bounded by circles in FIG. 2A are sampled and converted by the A/D converter into digital signals.

In the second frame, since the output of the frame address counter FAC becomes "0, 0, 1", each time the output of the counter CT becomes "0, 0, 1" the comparator CP produces an output so that only the image signals from the solid state photoelectric converting elements on the right to the column of the elements bounded by circles are converted into digital signals. In the same manner, in the third to eighth columns, the image signals are sequentially converted into digital signals by the A/D converter.

Although the solid state photoelectric converting element groups shown in FIG. 2A are scanned in the horizontal direction in the same manner as the standard television system, the response speed of the A/D converter that converts the image signals into digital signals may be low so that during scanning of eight frames, the solid state photoelectric converting elements in each row are scanned at each eighth element so that all elements are scanned during eight frames.

According to the response speed of the A/D converter, it may continuously convert the image signals into digital signals.

There are also provided a horizontal address counter HAC reset by the horizontal synchronizing signal HS for counting the number of the outputs of the comparator CP, an a vertical address counter VAC reset by the vertical synchronizing signal VS for counting the number of the horizontal synchronizing signal. In this example, the horizontal address counter HAC produces a 6 bit output, while the vertical address counter VAC produces an 8 bit output, and a 17 bit address designation signal is synthesized by using the 3 bit output of the frame address counter FAC as lower order bits, the output of the horizontal address counter HAC as intermediate order bits, and the output of the vertical address counter VAC as the upper order bits. This address designation signal AD is applied to the RAM so that the output of the A/D converter is stored in the RAM as the measured values according to the arrangement shown in FIG. 2A.

As shown in FIG. 3, the measured values stored in the RAM are read out on a data bus DB in accordance with an address designation signal sent over an address bus AB from the processor CPU and the image areas of respective zones $Z_1$ to $Z_8$ obtained by dividing the image bearing surface 15 are obtained by the arithmetic operation of the processor based on the read out measured values.

Figure 7A:
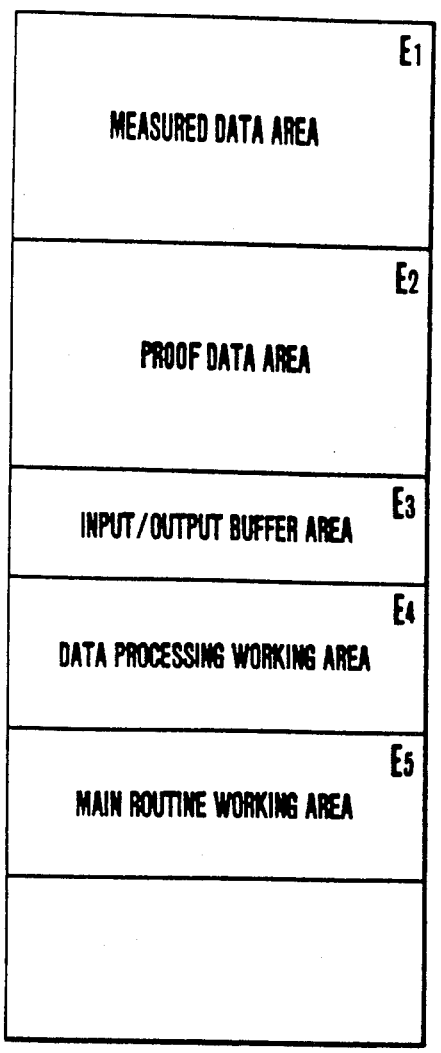
FIG. 7A shows the contents of a read access memory device (RAM)
Figure 7B:
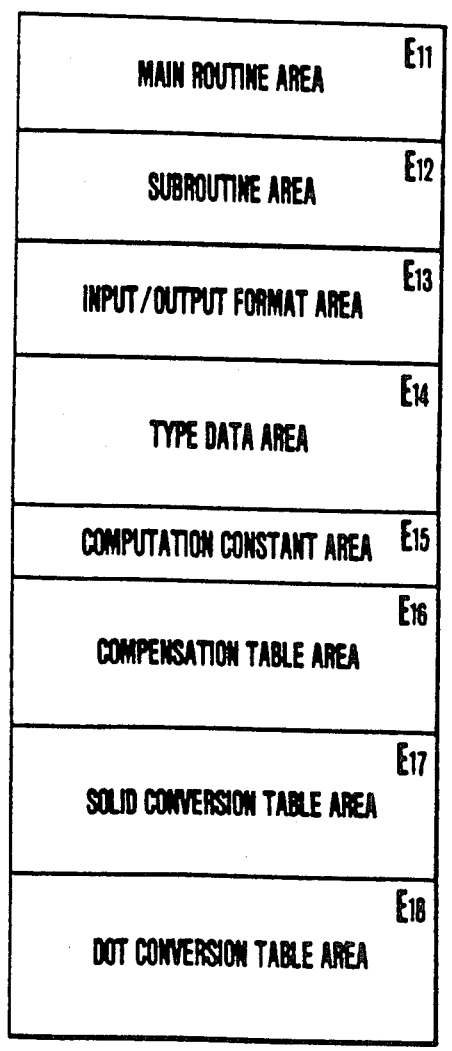
FIG. 7B shows the contents of a read only memory device (ROM)

FIG. 7A and 7B show the contents of the RAM and ROM respectively. The RAM includes a measured data area $E_1$ for storing the measured values, a proof data area $E_2$ for storing proof values, an input/output buffer area $E_3$ for temporarily storing inputs and outputs, a data processing working area $E_4$ for temporarily storing data necessary for processing data, and a main routine working area $E_5$ for temporarily storing data necessary for executing a main routine.

The ROM includes a main routine area $E_{11}$ for storing the main routine, a subroutine area $E_{12}$ for storing a subroutine, an input/output format area $E_{13}$ for storing data that determines the input/output format, a type data area $E_{14}$ for storing various types of the lithographic printing plate such as dimensions L, H, S and l and number of divided zones $Z_1$ to $Z_8$ shown in FIG. 2B, a computation constant area $E_{15}$ for storing various computation constants, a compensation table area $E_{16}$ for storing a compensation table utilized for correcting nonuniform brightness by using a proof plate of a uniform reflectivity, a solid conversion table area $E_{17}$ for storing a solid conversion table utilized to convert area ratio into the ink quantity being supplied, and a dot conversion table area $E_{18}$ for storing a dot conversion table utilized for the same purpose.

Figures 8, 9:
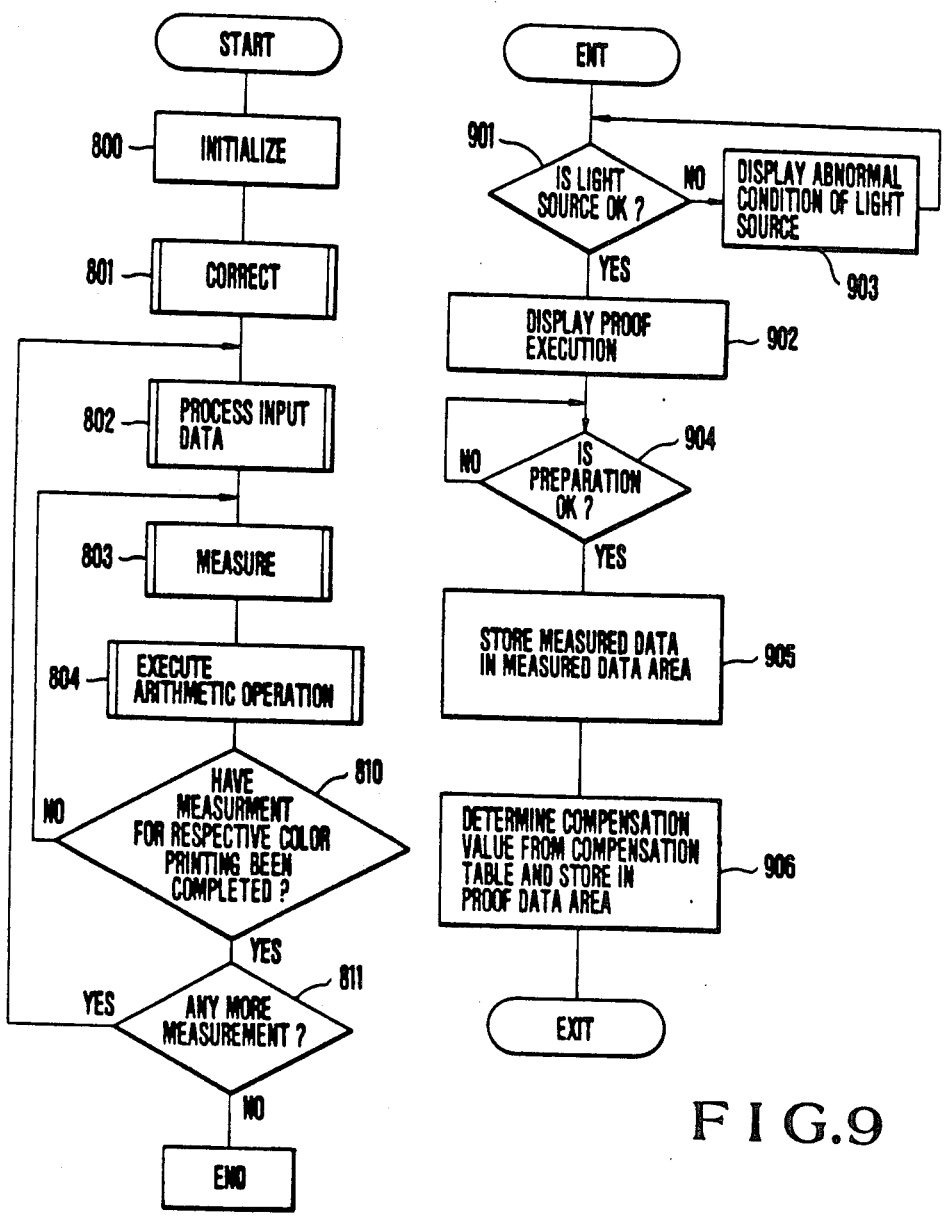
FIG. 8 is an overall flow chart showing the control and computation operations of a processor.
FIG. 9 is a flow chart showing the detail of the proof procedure.

FIG. 8 shows an overall flow chart showing the control and arithmetic operation executed by the processor CPU. According to this flow chart after a step labelled "START" at which a source switch is closed, various portions are initialized at a step 800 and then at a step 801 the nonuniform brightness is corrected with a correction plate having a uniform light reflective index instead of the lithographic printing plate.

After mounting the lithographic printing plate 3 the keyboard KB or switch group SW is used to give dimensions L, H, S and l and the number of divided zones $Z_1$ to $Z_8$ shown in FIG. 2B at a step 802 labelled "process input data" is determined. Then the measurements are made at a step 803 by the circuit shown in FIG. 3 in a manner described above and the arithmetical operation to be described hereinafter is executed at a step 804. The identical operation is repeatedly executed for the lithographic printing plates 3 for different colors until the rseult of judgment at a step 810 labelled "Have measurements for respective color printing been completed?" becomes YES.

Where the lithographic printing plates 3 utilized for different colors are sequentially measured, the result (step 811) of the judgment labelled "Any more measurements?" becomes YES and the steps 802 to 810 following the step 811 are repeated, whereas when the result is NO, a series of operations terminates.

FIG. 9 is a flow chart showing the detail of the proof. At a step 901 labelled "Is light source OK?", whether the light source 5 has been lighted or not is checked, and when the result of the check is YES, at a step 902 labelled "display proof execution", the state is displayed on the cathode ray tube CRT, and a proof plate having a uniform reflectivity is mounted instead of the lithographic printing plate. When the result of the check is NO, an abnormal light source is driven at a step 903 and an abnormal condition of the light source is displayed and then the process is returned to the step 901. When the result of judgment executed at a step 904 labelled "Is preparation OK?" is YES, the proof plate is photographed by the camera CAM and the measured values are determined by the circuit shown in FIG. 3. Measured values are stored in the measured data area $E_1$ of the RAM at a step 905 labelled "store measured date in measured data area". Then according to the content of the RAM, a step 906 labelled "determine compensation value from compensation table and store in proof data area is executed.

Figure 10:
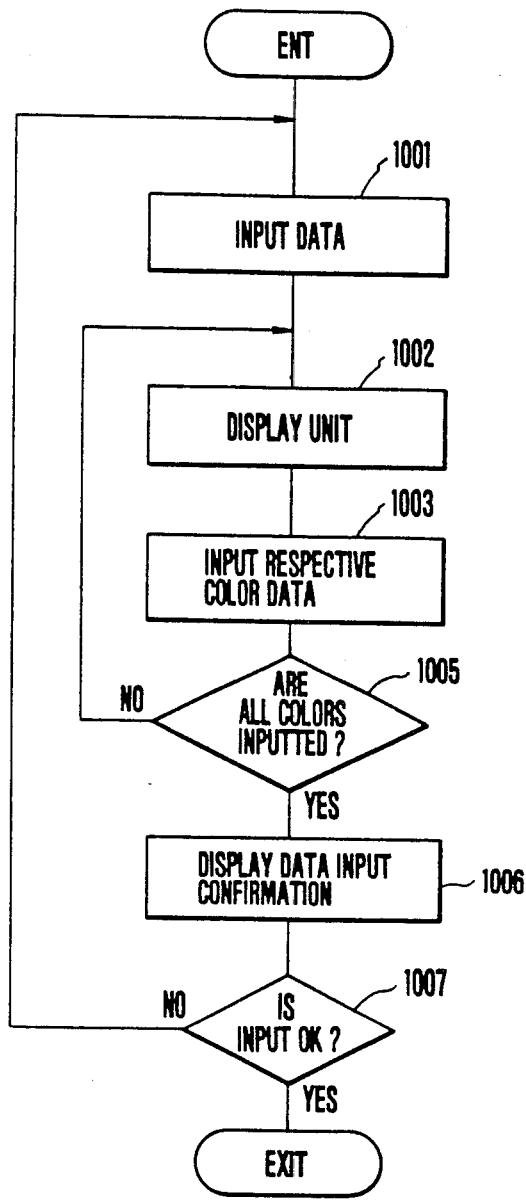
FIG. 10 is a flow chart showing the detail of the data input processing.

FIG. 10 is a flow chart showing the detail of the data input processing. Thus, at a step 1001 labelled "input data" a lithographic printing plate 3 is mounted and then dimensions L, H, S and l and the number of the divided zones $Z_1$ to $Z_8$ are given, and at a step 1002 labelled "display unit" these contents are displayed on the cathode ray tube CRT. At a step 1003 labelled "input respective color data" the types of the colors of the lithographic printing plate 3 are inputted from the switch group SW or keyboard KB. Then at a step 1005 labelled "Are all colors inputted?", whether the lithographic printing plates of all colors have been successively mounted or not is judged. When the result of this judgment is NO, the step 1002, and the succeeding step 1003, are repeated until the result of judgment becomes YES. Then at a step 1006 labelled "display data input confirmation", the input data for respective colors are displayed by the cathode ray tube CRT. When the display is confirmed by an operator, the operator operates a CR key of the switch group SW to render the result of the judgment "Is input OK?" at a step 1007 to be YES.

Figure 11:
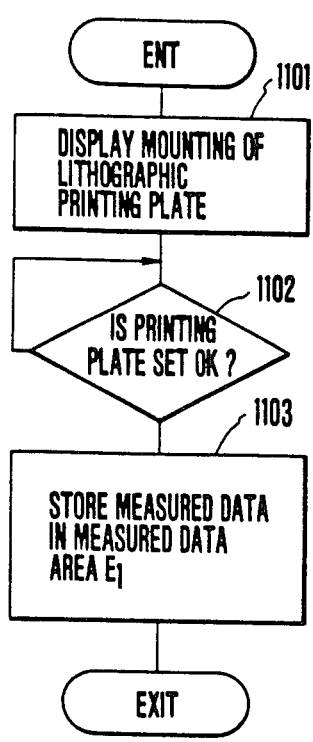
FIG. 11 is a flow chart showing the detail of measurement.

FIG. 11 is a flow chart showing the detail of the measurement. At a step 1101 labelled display mounting of lithographic printing plate, whether the fact that a lithographic printing plate has been normally mounted or not is displayed on the cathode ray tube CRT. Then whether the lid 2 is completely closed or not is checked by a door switch, not shown. When the lid is completely closed, the result of the judgment judgement of a step 1102 labelled "Is printing plate set OK?" becomes YES and at a step 1103 labelled "store measured data in measured data area $E_1$" the measured data of the lithographic printing plate 3 are stored in the data area $E_1$ of the RAM.

Figure 12:
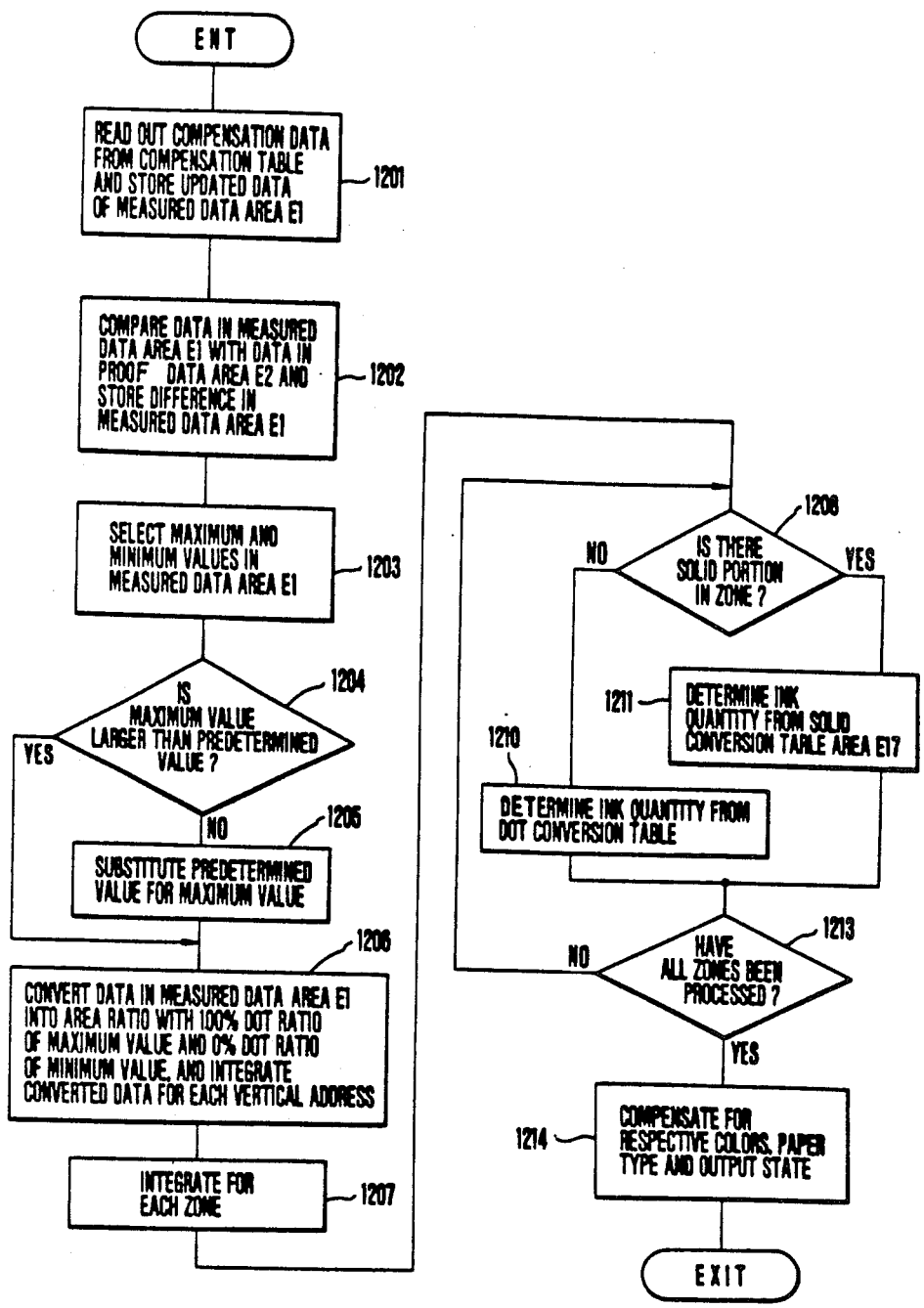
FIG. 12 is a flow chart showing the detail of the arithmetic operation.

FIG. 12 is a flow chart showing the detail of the arithmetic operation. At a first step 1201, compensation data are read out from the compensation table and the content of the measured data area $E_1$ of the RAM is updated. Then at a step 1202, data in the measured data area $E_1$ is compared with the data in the proofed data area $E_2$ and the difference is stored in the measured data area $E_1$ of the RAM and thus, the measured value for the lithographic printing plate 3 is corrected.

Then the maximum and minimum data in the measured data area $E_1$ are selected at a step 1203, and then at a step 1204 whether the maximum data is larger than a predetermined value or not is judged. When the result is NO, a step 1205 is executed so that the predetermined value is substituted for the maximum value to form an information corresponding to the solid portion. Then, at a step 1206 the data in the measured data area $E_1$ are converted into an area ratio with maximum and minimum values regarded as 100% and 0% dot ratios respectively, and the converted data are integrated for each vertical address formed by respective columns of the solid state photoelectric converting elements. Then at a step 1207 the data are integrated for each zone.

Then at a step 1208 a judgment is made as to whether each one of the zones $Z_1$ to $Z_8$ contains a solid portion or not and when the result of the judgment judgement is YES, a step 1210 is executed and the quantity of ink being supplied is determined from the solid conversion table in the solid conversion table area $E_{17}$ in the ROM. Whereas when the result of the judgment judgement is NO, a step 1211 is executed and the quantity of ink to be supplied is determined from the dot conversion table in the dot conversion table area $E_{18}$ of the ROM.

The steps described above are repeated so long as all zones are not yet processed. When the result of the judgment is YES at a step 1213, a step 1214 is executed and the ink quantity is multiplied with a coefficient read out from the computation constant area $E_{15}$ for executing compensations for colors, sheets of paper, and output states.

Ultimately, the quantity of ink is determined by the degree of opening of an ink pot key that determines the quantity of ink supplied to the inking rollers of the printing press and a signal corresponding to the ink quantity is sent to be recorded on a magnetic card or to be printed out by the printer PT. The ink quantity is also displayed on the cathode ray tube CRT.

FIG. 13 shows the characteristics of a compensation table stored in the compensation table area $E_{16}$ of the ROM which is depicted as a logarithmic curve. The proof value and the compensation value are determined from the compensation table having the characteristics shown in FIG. 13 in accordance with the measured value from the proof plate and the measured value from the lithographic printing plate 3. A correct measurement result can be obtained from the difference of the proof value and the compensation value.

More particularly, let us denote the light reflectivity at the solid portion by $R_{100}$ and that at 0% dot ratio by $R_0$. Since the quantity of the reflected light is proportional to the quantity of light emitted from the light source 5, where the area of the printing plate contains only the solid portion and when the area of the printing plate contains only 0% dot ratio are expressed by A, the ratio a between measured values at the same brightness becomes constant and can be shown by the following equation.

$$A \cdot R_0 / A \cdot R_{100} = R_0 / R_{100} = a \tag{1}$$

Where $x = a^y$, equation (1) becomes $$Y = \log x / \log a \tag{2}$$

When a measured value $a^n$ is obtained by irradiating a lithographic printing plate containing only a solid portion, since $R_0 = R_{100} a$, the measured value of a lithographic printing plate of 0% dot ratio is $a^{n+1}$ so that the following equation holds $$\begin{aligned} y_0 - y_{100} &= \frac{\log x_0}{\log a} - \frac{\log x_{100}}{\log a} \\ &= \frac{\log a^{n+1} - \log a^n}{\log a} \\ &= \frac{\log a^n + \log a - \log a^n}{\log a} \\ &= 1 \end{aligned} \tag{3}$$

where $y_0$ and $x_0$ are data of a lithographic printing plate containing only 0% dot data and $y_{100}$ and $x_{100}$ are data of a lithographic printing plate containing only the solid portion.

For this reason, for any degree of brightness, the measured value at the solid portion and the measured value at a portion of 0% dot ratio are determined from the characteristic curve shown in FIG. 13. A correct value under nonuniform brightness can be determined from the difference between these measured values.

The compensation table can be prepared from the equation described above, but it can be prepared by preparing two test plates having slightly different relfectivity, varying the quantity of the irradiated light and then plotting the measured values of the reflected light quantities.

FIG. 14 shows characteristics of the conversion tables stored in the conversion table areas $E_{17}$ and $E_{18}$, in which curve A corresponds to the solid conversion table, and curve B corresponds to the dot conversion table. In FIG. 14, the abscissa represents the integrated area percentage $\alpha$ corresponding to the image areas of respective zones $Z_1$ to $Z_8$, and the ordinate represents the degree of opening K of the ink fountain key.

At the time of printing, the quantity of ink is increased for the solid portion of the lithographic printing plate 3 to make clear the printed solid portion. For portions having low percentage of dot ratio other than the solid portion, the quantity of the ink is decreased, thus preventing oozing out of the ink. When the degree of opening of the ink fountain for each one of the zones $Z_1$ to $Z_8$ is adjusted according to the integrated area percentage and in accordance with the presence or absence of the solid portion, a satisfactory printing can be obtained through the experimental characteristic shown in FIG. 13.

It will be clear that the characteristic shown in FIG. 14 varies depending upon the type of the printing press and various printing conditions so that an optimum characteristic should be selected according to existing conditions.

The constructions shown in FIGS. 1, 3 and 6 may be changed so long as the desired performances can be provided. Furthermore, the number of the solid state photoelectric converting element groups, the manner of mounting the lithographic printing plate, and the number of divided zones $Z_1$ to $Z_8$ can be suitably selected. Some of the steps of the flow charts shown in FIGS. 8 through 12 may be omitted or the order of the steps may be altered.

As described above, according to the present invention it is not necessary to provide a proof solid portion for a lithographic printing plate so that it is possible to make accurate measurement of any type of the printing plate and to readily manufacture the printing plate. Moreover, image areas of various types of the lithographic printing plate can be measured.

Moreover, according to this invention, as the image area can be determined by a mere subtraction operation without relying upon complex multiplication and division operations, not only can the time required for the arithmetic operations be reduced but the measuring speed can also be greatly increased.

What is claimed is:

1. A method of judging an image signal for use in an image area measuring apparatus of the type wherein an image bearing surface of a lithographic printing plate is photographed with a television camera to produce image signals, the image signals being converted into digital signals to obtain measured value data, and an image area of each one of a plurality of zones formed by dividing said image bearing surface is determined by an arithmetic operation utilizing said measured value data, said method comprising the steps of:

selecting maximum and minimum values from said measured value data;

comparing said selected maximum value with a predetermined value which is less than the value corresponding to an actual 100% dot ratio to determine which has a greater value; and converting each value of said measured value data to a dot area ratio wherein said determined greater value corresponds to a 100% dot ratio and said selected minimum value corresponds to a 0% dot ratio.

* * * * *

UNITED STATES PATENT AND TRADEMARK OFFICE
CERTIFICATE OF CORRECTION

PATENT NO. : 4,763,359

DATED : August 9, 1988

INVENTOR(S) : Tsunoda et al

It is certified that error appears in the above-identified patent and that said Letters Patent is hereby corrected as shown below:

Column 3, line 54, delete "microprocesor" and insert ---- microprocessor ----.

Column 7, line 21, delete "rseult" and insert ---- result ----.

Column 7, line 46, delete "date" and insert ---- data ----.

Column 8, line 12, delete "judgement".

Column 8, line 25, after "and" insert a comma ---- , ----.

Column 8, line 43, delete "judgement".

Column 8, line 47, delete "judgement".

Signed and Sealed this

Seventeenth Day of January, 1989

Attest:

DONALD J. QUIGG

*Attesting Officer*  *Commissioner of Patents and Trademarks*